Dec. 22, 1931.  W. N. GILBERT  1,838,019
EVEN BALANCE SCALE
Filed June 20, 1928
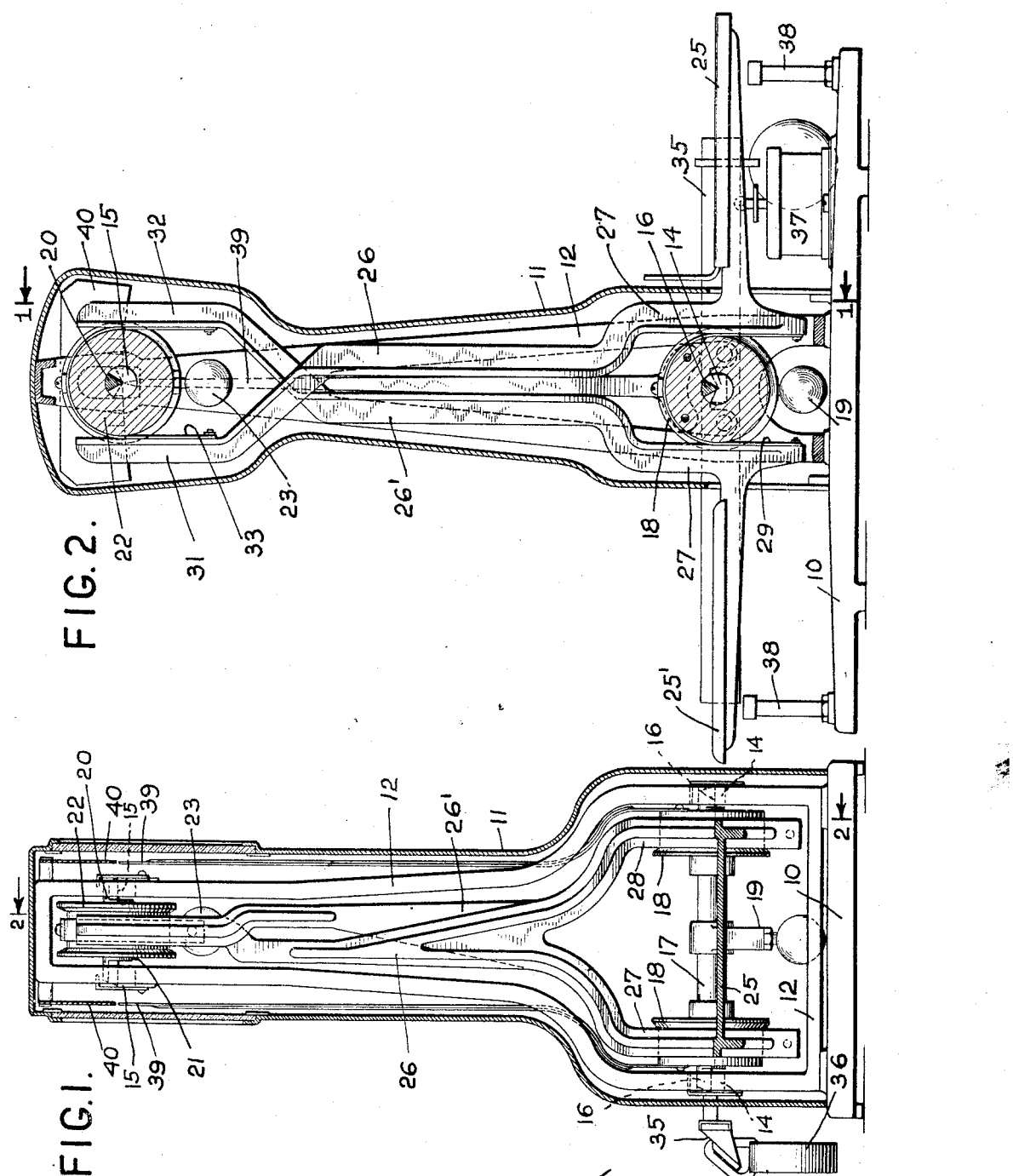

Patented Dec. 22, 1931

1,838,019

UNITED STATES PATENT OFFICE

WILLIAM N. GILBERT, OF HUDSON HEIGHTS, NEW JERSEY, ASSIGNOR TO DAYTON SCALE COMPANY, OF DAYTON, OHIO, A CORPORATION OF NEW JERSEY

EVEN BALANCE SCALE

Application filed June 20, 1928. Serial No. 286,730.

This invention relates to weighing scales, particularly of the even balance type.

Such scales comprise essentially opposite arms which support pans or platforms, one of which receives a known weight and the other the object to be weighed. When the weights on both pans are equal, the pans are at substantially the same height. An excess of weight on one pan over the other if the scale is accurately adjusted, will overthrow the balance completely. It is desirable in many cases to provide an indication of the amount on the pan over or under the desired weight. This facilitates weighing operations by informing the operator of approximately how much to add or subtract from the load pan to obtain the desired weight. To accomplish this result, auxiliary counterbalancing mechanism is ordinarily combined with the even balance scale including an indicator and a graduated chart mounted for relative movement. Usually, the chart has its zero mark at the center, graduations on one side indicating amounts over and graduations on the other side indicating amounts under. This arrangement is not absolutely necessary as the chart may be graduated to indicate either amounts over or under only. the zero point being placed at one of the sides of the chart. By means of such auxiliary counterbalancing mechanism, it is also possible to weigh small amounts, not using the even balance feature of the scale.

The placing of the scale on an inclined support will introduce an error in the readings unless compensating means are provided. Ordinarily, with the chart fixed to the scale frame and the indicator rigidly mounted on the balance beam, if the scale base is placed on an inclined support, the chart will be inclined with the frame from its normal position while the indicator will retain its normal zero position since the beam to which it is fixed is pivoted on the frame. The indicator will therefore fail to read correctly on the chart.

The object of this invention is to devise an improved even balance scale combining an automatic counterbalancing feature.

Another object of the invention is the provision of means for preventing the scale from reading incorrectly when resting on an inclined support.

Still further, the object of the invention is to provide an even balance scale with an automatic counterbalancing feature which inherently counteracts the tendency of the scale to read incorrectly when placed on an inclined support.

Further and other objects and advantages will be hereinafter set forth in the accompanying specification and claims, and shown in the drawings, which by way of illustration show what is now considered to be the preferred embodiment of the invention.

In the drawings:

Fig. 1 is a section on line 1—1 of Fig. 2;

Fig. 2 is a section on line 2—2 of Fig. 1.

Referring to the drawings in detail, the scale comprises a base 10 on which is fixed a housing 11 and a two-sided open frame 12 located within the housing. The sides of the frame are provided adjacent their lower ends with alined V-shaped agate bearings 14. Similar bearings 15 are provided adjacent the upper ends of the frame sides. The lower bearings 14 support knife edges 16 on the ends of a shaft 17 having fixed thereto adjacent each knife edge a wheel 18. Midway between the ends of shaft 17 is secured a pendulum bob 19.

The upper bearings 15 support knife edges 20 on a short shaft 21 carrying a pulley 22 to which is affixed a pendulum bob 23 equal in weight to pendulum bob 19.

On opposite sides of the shafts 17 and 21 are disposed the platform structures comprising load supporting portions 25 and 25' and vertical arms 26 and 26' integral respectively with the pan portions. The lower portions of the arms 26 and 26' are bifurcated, the furcation 27 on one arm being opposite the furcation 27 on the other arm while furcations 28 on the arms are also opposite each other. Between furcations 27 and in line therewith is one of the wheels 18 and similarly between furcations 28 is the other wheel 18. A tape 29 is attached to the lower ends of the furcations 27, passing from one furcation over the periphery of wheel 18 in line therewith and to the lower end of the opposite furcation. A similar tape is provided passing from one furcation 28 to the other furcation 28 over the wheel 18 in line therewith. These tapes are fastened by screws or the like to the wheels 18 over which they pass.

The upper portions of arms 26 and 26' are offset and cross each other so that the upper portion 31 of the arm 26 is to the left of the upper portion 32 of arm 26' while the lower portion of the arm 26 is to the right of the lower portion of arm 26' (as viewed in Fig. 2). The upper portions are alined opposite each other with the wheel 22 between them. A tape 33 attached to portion 31 passes over wheel 22 to which it is also fastened and from the wheel to the portion 32 to which it is attached.

A beam 35, positioned outside the housing is fastened to the left wheel 18 (as viewed in Fig. 1) and a weight 36 hanging thereon may be adjusted to provide for tare.

The usual dash pot 37 is acted on by one of the platforms to damp oscillations.

Posts 38 limit the swinging movement of the platforms and prevent the pointers 39 from striking the sides of the housing.

In operation, the load on a pan causes the arm integral therewith to move down vertically, the arm being prevented from tilting because of its engagement on the right and left sides with the wheels 18 and 22 fixed in location. The pans integral with the arms are thus also prevented from tilting and the use of check links is avoided. The movement of the arm 26 or 26' downward will rotate wheels 18 in one direction and wheel 22 in the opposite direction until the moments of the pendulum weights counterbalance the load on the pan. The load on the opposite pan tends to cause rotation of the wheels in directions opposite to the directions of rotation caused by the load on the other pan. If the loads on each pan are equal, the wheels will not rotate and the pendulum weights will remain in vertical positions.

If the scale base is placed on a sloping support, the pendulum weights and the platforms will be tilted with the base to the same extent as the indicating chart which is fixed to the housing. In effect, all the parts of the scale will be in the same relative position no matter what the slope of the scale support may be. This results from the relationship of the wheels 22 and 18 and the platform structures. Thus, it is apparent that if the scale base be placed on an incline, the weights 19 and 23 will tend to remain in a vertical position. In order for this to take place, the wheels 22 and 18 to which the weights are connected must rotate in the same direction relatively to the housing. The tendency of wheel 22 to rotate relatively to the frame in a clockwise direction, for example, tends to lift arm 26. However, the tendency of wheels 18 to move clockwise tends to lower arm 26. Thus wheels 18 and wheel 22 counteract each other and there is no movement of the arms 26 or 26' relatively to the wheels upon tilting of the scale base. Hence wheels 18 and 22 do not rotate on their support 12 which is fixed to the base and the same relative positions of the pendulums and the scale housing will be maintained as when the scale base rests on a level support. The indicating pointers fixed to the wheels 18 will therefore maintain the same positions relative to the charts 40 no matter at what angle the base is supported.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims:

1. A scale comprising a pair of opposite platforms, a plurality of pendulums one above the other, and tape connections from each platform to each pendulum.

2. A scale comprising a pair of opposite platforms, a rigid extension on each platform, a pair of pendulums, and connections from each extension to each pendulum.

3. A scale comprising a pair of opposed platforms, an upper and a lower pendulum, and flexible connections between said platforms and between said platforms and pendulums.

4. A scale comprising a pair of opposed platforms, an upper and a lower pendulum in vertical alinement, a rigid extension on each platform, and flexible connections between said extensions, said flexible connections being attached to said pendulums.

5. A scale comprising a pair of opposed platforms, a rigid extension on each platform, and a pair of pendulum structures, one above the other, said pendulum structures comprising an actuating portion and a pendulum weight, said extensions acting on opposite sides of said actuating portions.

6. A scale comprising a pair of opposed platforms, a rigid vertical extension on each platform, an upper and lower pendulum, the upper and lower pendulums being positioned on opposite sides of an extension, and connections between said extensions and said pendulums.

7. A scale comprising a pair of opposed platforms, a rigid vertical extension on each platform, an upper and lower pendulum, the upper and lower pendulums being positioned on opposite sides of said extensions and between said extensions, and operating connections between said pendulums and said extensions.

8. A scale comprising a pair of platforms, a rigid extension on each platform, an upper and lower pendulum structure comprising a circular portion and a pendulum weight, and connections between said circular portions and each extension whereby a load placed on a platform will move the pendulums in opposite directions.

9. A scale comprising a pair of platforms, a rigid extension on each platform, an upper and lower pendulum structure comprising a circular portion and a pendulum weight, and connections between said platforms and said pendulum structures whereby a load placed on one platform will move the pendulums in directions opposite to which they are moved when a load is placed on the other platform.

10. A scale comprising a pair of opposed platform structures and automatic counterbalancing means effective for loads on the platforms adapted to constrain each of said structures to movement parallel to itself upon a weighing operation.

11. In a scale including a housing, chart, and indicator cooperating with the chart, a pair of platform structures, and upper and lower counterbalancing means flexibly connected to each platform structure, said counterbalancing means being effective to compensate for tipping of the scale frame.

12. A scale comprising a pair of opposed platform structures, and counterbalancing means for loads on said platforms, said counterbalancing means being effective to prevent tipping of a platform when a load is placed on an end thereof.

13. A scale comprising a platform structure including a vertical extension, rockable means, and means for connecting both sides of said extension to the rockable means to prevent tipping of said platform.

14. A scale such as described in claim 13, and counterbalancing means connected to said rockable means to oppose movement of said platform.

15. A scale comprising a plurality of platform structures, a plurality of counterbalancing devices, and separate connections from each platform structure to each counterbalancing device, said platforms coacting through said connections to oppose the effect of each other upon said devices.

16. A scale comprising a plurality of platform structures, a plurality of movable counterbalancing weights, and separate connections from each structure to each weight, said structures acting through said connections to oppose the effect of each other in moving said weights.

17. A scale comprising a pair of opposed platforms, a plurality of counterbalancing weights, and separate flexible connections from each platform to each of said weights, the connections from one platform opposing the tendency of the connections from the other platform to move said weights.

18. A scale comprising a plurality of pendulums, a pair of platforms, each platform having connected therewith a plurality of connecting elements, each element being connected to a different one of said pendulums, said platforms opposing the movement of each other through said elements upon a weighing operation.

19. A scale comprising a plurality of platforms, a counterbalancing device, and a connecting means between said platforms and said device, said device coacting with said means to constrain each platform for movement parallel to itself upon a weighing operation.

20. A scale comprising a plurality of platform structures, a counterbalancing device, and connections from said structures to said device, said device guiding said structures for vertical translatory movement, 21. A scale comprising a plurality of platform structures, a counterbalancing device, and connections from said structures to said device, said device being effective to completely and solely by itself constrain each structure to movement parallel to itself.

22. A scale comprising a plurality of platform structures, a counterbalancing device, and connections from said structures to said device, said structures being supported through said connections compeltely and solely by said device and having opposite effects on said device.

23. A scale comprising opposed platforms, a counterbalancing device and connections between said device and said platforms to constrain said device to counterbalance loads on either platform, said device coacting with said platforms, to completely and solely by itself prevent tipping of either platform when a load is placed on an end of the platform.

24. A scale comprising a pair of opposed platforms, upper and lower counterbalancing members, and connections from each of said platforms to each of said members for moving said members in particular directions upon a load being placed on one platform and moving said members in other directions upon a load being placed on the other platform.

25. A scale comprising a counterbalancing device, a pair of opposed platforms, each platform carrying a connecting element, and means for connecting said device to opposite sides of each connecting element, said platforms being effective through said connecting elements to oppose movement of each other.

26. In a scale of the even balance type; a pair of opposed platforms, a plurality of rockable elements provided with curved faces, and connections between each platform and said faces for adapting said elements to constrain the platforms to move in opposite directions.

27. In a scale of the even balance type; a pair of opposed platforms provided with vertical extensions, and a plurality of vertically spaced rockable elements interposed between and cooperating with said extensions for preventing tipping of the platforms.

28. In a scale of the even balance type, a pair of platform structures, a plurality of arcuately faced rockable elements, and connections between the arcuate faces of said elements and said structures for adapting the said elements to completely and solely support the structures and constrain them to move in opposite directions.

29. In a scale of the even balance type, a pair of platform structures, a plurality of rockable elements having rolling engagement with said structures for constraining them to translatory movement, and counterbalancing means connected to said elements for opposing movement of the platforms.

30. A scale of the even balance type comprising a pair of platforms, a plurality of counterbalancing elements, a frame for pivotally supporting said elements, indicating means fixed to said frame, cooperating indicating means associated with said counterbalancing elements, and connections between said platforms and said elements for controlling said elements to prevent any relative movement between the cooperating indicating means due to tipping of the frame.

31. An even balance scale comprising a pair of opposed load-bearing supports, each connected to a vertical extension, upper and lower means for constraining the supports to equal angular, opposite, movements, at least one of said means consisting of a rotatable member interposed between the vertical extensions for guiding the supports for parallel movement, and means for effecting coaction between the structures and said means including flexible connections between said vertical extensions and said rotatable member.

32. An even balance scale comprising a pair of opposed load supports, uprights connected to said supports, means for constraining the load supports to opposite and parallel movement, said means including at least one rotatable member interposed between and in sushtantial engagement with said uprights, and means for effecting cooperation between the supports and said means including flexible elements connecting the uprights to the rotatable member.

33. An even balance scale comprising a pair of opposed load supports, uprights connected to said supports, means for constraining the supports to opposite and parallel movement, said means including a rotatable member interposed between and in rolling engagement with said uprights, and connections between the uprights and said member for determining the vertical positions of the uprights relative to said rotatable member.

34. An even balance scale comprising a pair of opposed load supports, uprights rigidly connected with said supports, means for constraining the supports to opposite and parallel movement, said means including a rotatable member having a curved periphery interposed between and in rolling engagement with said uprights, and means for cooperatively associating the supports with said means including flexible elements connecting the uprights to said periphery.

35. An even balance scale comprising a pair of opposed load supports, uprights connected to said supports, means for constraining elements for constraining the supports to opposite and parallel movement, at least one of said elements being interposed between said uprights, and means for maintaining the uprights in rolling coaction with the rotatable element interposed therebetween.

In testimony whereof I hereto affix my signature.

WILLIAM N. GILBERT.

CERTIFICATE OF CORRECTION.

Patent No. 1,838,019.  Granted December 22, 1931, to

WILLIAM N. GILBERT.

It is hereby certified that error appears in the printed specification of the above numbered patent requiring correction as follows: Page 4, line 84, claim 35, for the word "to" read with, and in same line, strike out the words "means for constrain-" and insert words a pair of rockable; and that the said Letters Patent should be read with these corrections therein that the same may conform to the record of the case in the Patent Office.

Signed and sealed this 23rd day of February, A. D. 1932.

M. J. Moore,
(Seal) Acting Commissioner of Patents.